No. 819,156. PATENTED MAY 1, 1906.
L. G. MORRILL.
APPLIANCE FOR PUTTING TIRES ON THE RIMS OF VEHICLES.
APPLICATION FILED MAR. 11, 1905.
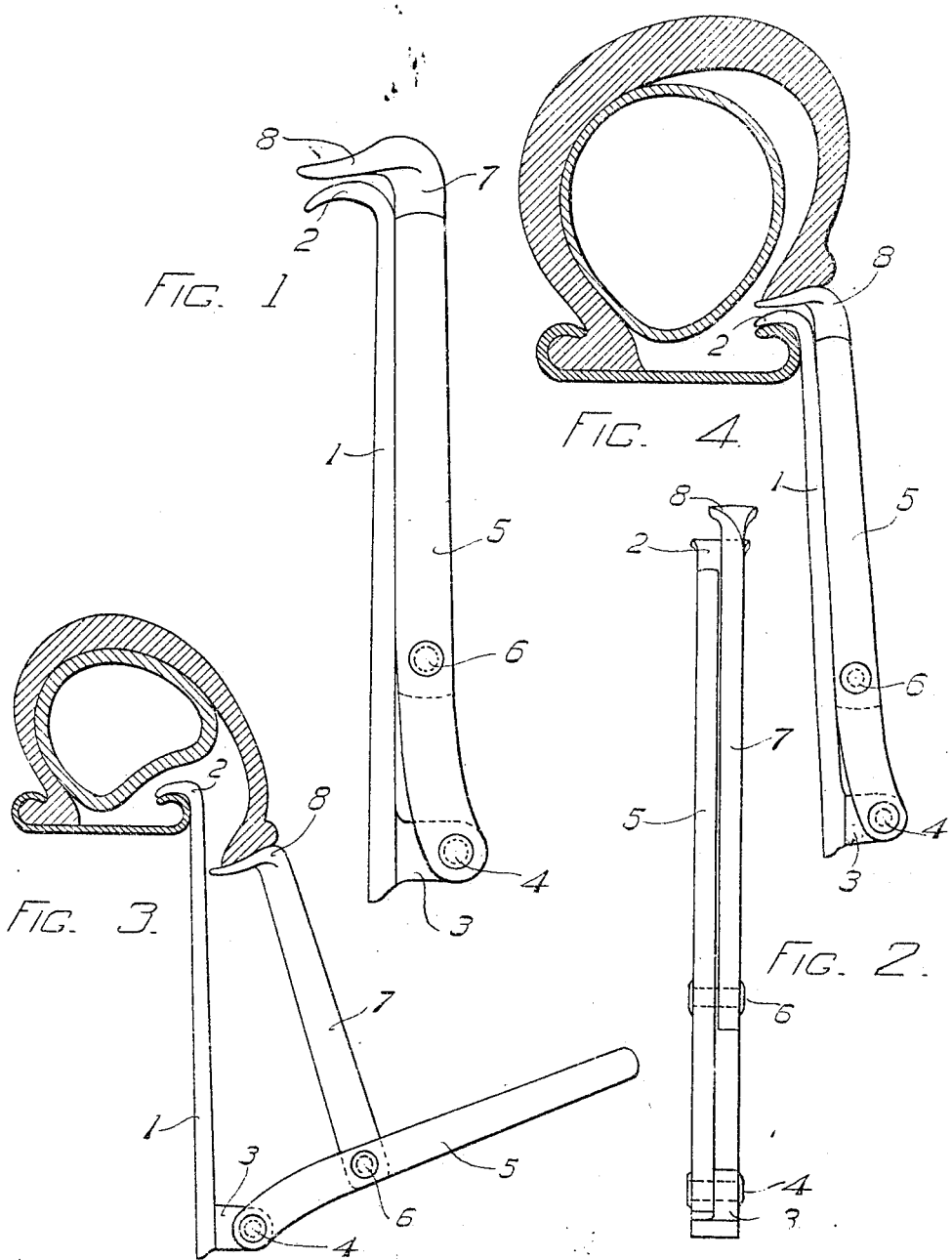
WITNESSES
INVENTOR

UNITED STATES PATENT OFFICE.

LEON G. MORRILL, OF NORWOOD, MASSACHUSETTS.

APPLIANCE FOR PUTTING TIRES ON THE RIMS OF VEHICLES.

No. 819,156.     Specification of Letters Patent.     Patented May 1, 1906.

Application filed March 11, 1905. Serial No. 249,572.

*To all whom it may concern:*

Be it known that I, LEON G. MORRILL, a citizen of the United States, and a resident of Norwood, county of Norfolk, State of Massachusetts, have invented certain new and useful Improvements in Appliances for Putting Tires on the Rims of Vehicles, of which this is a specification, reference being had to the accompanying drawings.

My invention relates to an appliance for use in putting tires upon the rims of vehicles, and is particularly adapted to the putting on of the type of rubber tires known as the "double-tube" or "clencher" variety, although it is equally useful in putting on tires of other types.

The objects of my invention are to provide means for putting on tires that has a powerful leverage, that will not strain, cut, or bruise the tire, and that cannot pinch and cut the inner tube when used to put on the double tire.

Another object of my invention is to so construct an appliance for putting on tires on the rims of vehicles that it can be folded to occupy a small space when not in use.

In the drawings accompanying this specification, Figure 1 is a side elevation of my improved appliance as it appears when folded. Fig. 2 is an edge view of my appliance when folded. Fig. 3 is a side elevation of my appliance applied to the rim of a wheel preparatory to forcing a tire onto the rim. Fig. 4 is a side elevation of my appliance as it appears after the edge of the tire has been forced upwardly to a point where it can be pushed inwardly on the rim of the wheel.

In the drawings, 1 is the front portion of my appliance and has at its upper end the hook portion 2, so formed as to hook upon the edge of a vehicle-rim. 3 is an outwardly-projecting portion at the opposite end of the member 1, having the pivot 4 secured therein.

5 is a lever pivoted at one of its ends on the pivot-point 4 and having a pivot 6 near its mid-portion.

7 is a push member pivoted on the pivot 6 and having at its other end the portion 8, standing at approximately right angles to its body portion.

The lever 5 is so pivoted that it can be revolved upon the pivot-point 4 until its body portion lies against the member 1, and the member 7 is so formed that its body portion will lie against the member 1 and its hook portion will throw over and overlap the portion 2 of the member 1.

The operation of my device is as follows: When used to put a tire upon the rim of a vehicle, the hook member 2 is inserted upon the rim of the vehicle, as shown in Fig. 3, the lever 5 is thrown downward, as shown in said figure, and the portion 8 inserted under the tire. The lever 5 is then turned upwardly upon the pivot 4, thereby pressing the member 7 upwardly until the right-angular portion 8 slides over and overlaps the portion 7, thereby carrying the tire in where it may be pushed over the edge of the rim, as shown in Fig. 4.

The pivot-pins in the members 1, 5, and 7 are so arranged that when said members are folded to the position shown in Fig. 4 the member 7 is locked against downward movement by reason of any pressure exerted on the portion 8 thereof. This action of the members is an improved feature, in that it prevents the tire-cover from slipping off the wheel.

I wish it understood that the form of my device and the manner of assembling it may be varied from that shown in the drawings without departing from the spirit of my invention.

Having described my invention, what I claim is—

1. The combination in an appliance for putting tires on vehicles of a hook member having a hook portion at one end and a pivot portion near its other end; a lever pivoted at one of its ends to one end of the hook member; a pusher member pivoted at one end to the lever and arranged to move longitudinally of the hook member, said pusher member having a head laterally extending therefrom, and arranged to overlap the hook of said hook member the pivots in all said members being so arranged as to lock the pusher member against longitudinal movement when the lever is pushed upward against the hook member.

2. The combination in an appliance for putting tires on vehicles, of a stationary member having a hook at one of its ends adapted to hook over the rim of a wheel; a lug near its other end; a lever having its inner end pivoted to said lug; a pusher member adapted to slide longitudinally of said stationary member; a head upon said pusher member laterally extending therefrom adapted to slide upon said stationary member and overlap its hooked portion, the lower end of said pusher member being pivoted to the lever in such manner as to be moved longitudinally by the rotation of said lever member.

In testimony whereof I have hereunto set my hand, in the presence of two subscribing witnesses, this the 10th day of March, A. D. 1905.

LEON G. MORRILL.

Witnesses:
R. P. ELLIOTT,
H. M. KELSO.